June 5, 1956
A. A. WHITE
2,748,921
RETRACTABLE FINGER MECHANISM FOR
CYLINDRICAL FEEDERS FOR COMBINES
Filed Sept. 29, 1954
2 Sheets-Sheet 1
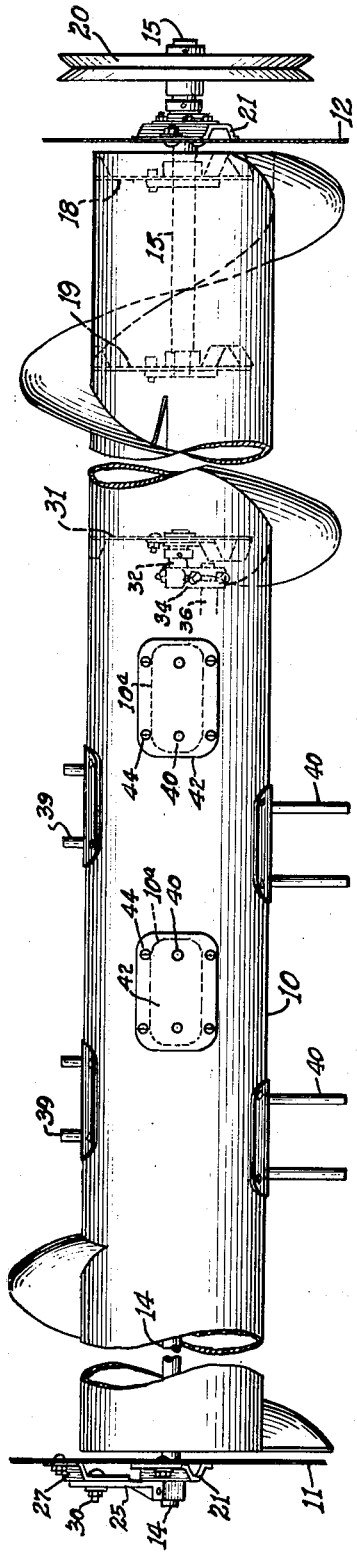
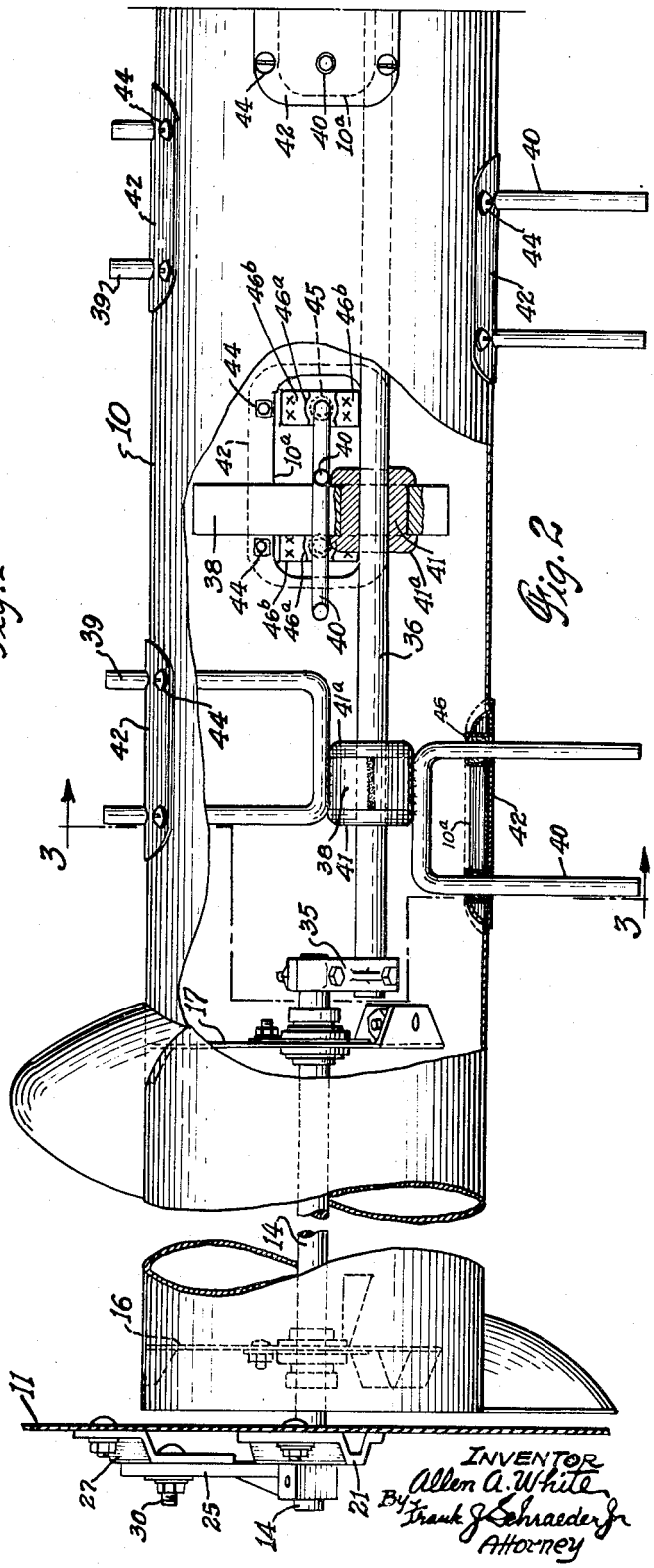
INVENTOR
Allen A. White
By Frank J. Schraeder Jr.
Attorney

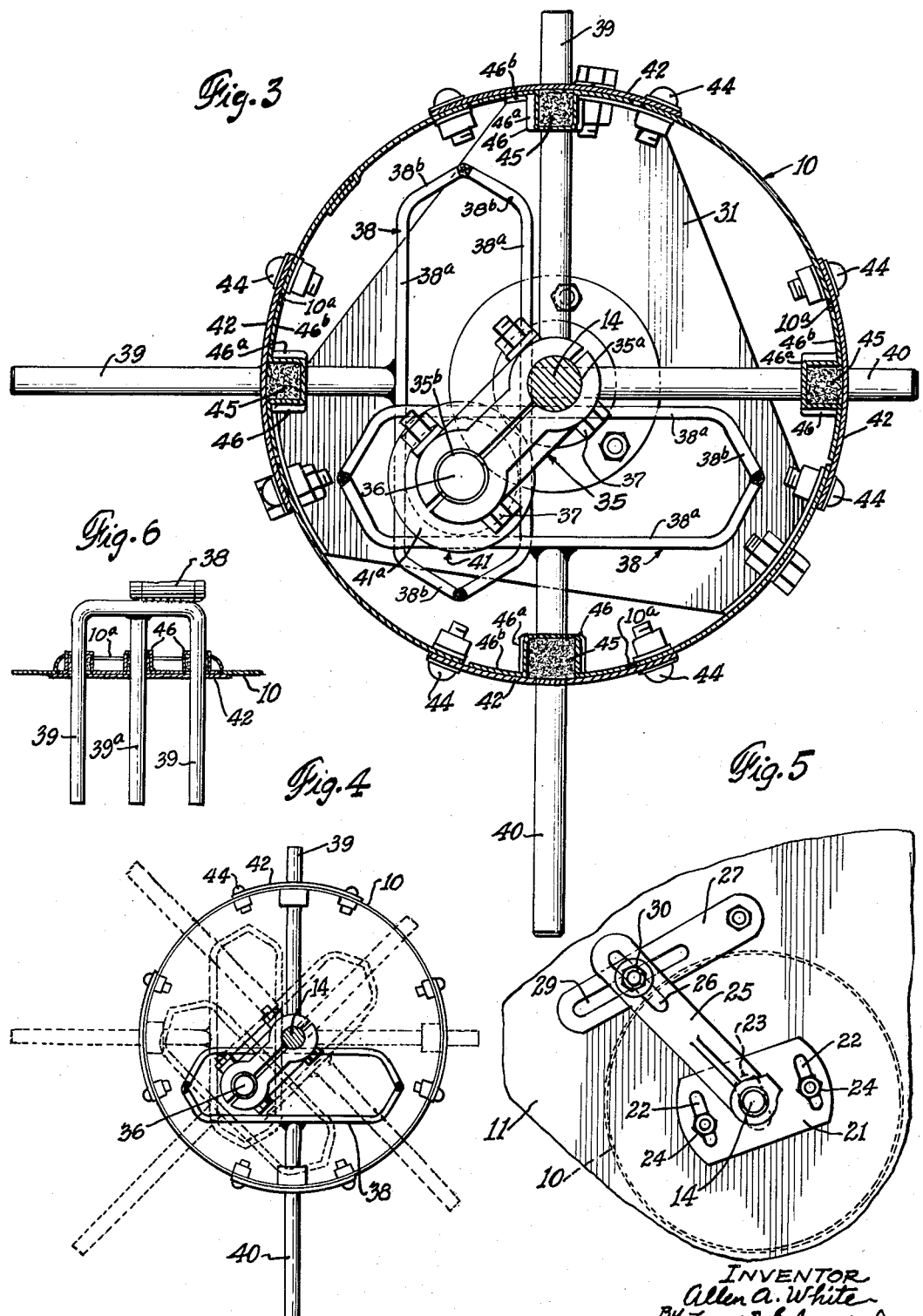

United States Patent Office 2,748,921
Patented June 5, 1956

2,748,921

RETRACTABLE FINGER MECHANISM FOR CYLINDRICAL FEEDERS FOR COMBINES

Allen A. White, Peabody, Kans., assignor to Hesston Manufacturing Company, Inc., Hesston, Kans., a corporation of Kansas Application September 29, 1954, Serial No. 459,116

14 Claims. (Cl. 198—211)

In combines for harvesting and threshing grains a common practice is to employ tubular or hollow cylindrical members, arranged horizontally, as part of the means to collect the crop and feed it to the threshing apparatus; some of these members being provided with more or less radial fingers which are alternately extended well beyond the cyindrical surfaces and retracted as said members revolve.

In the conventional type of finger mechanism the fingers not only move in and out, but they also rock in planes at right angles to the axes of the cylinders. Such constructions are costly, both initially and with respect to upkeep. For example, complex, movable bearings are needed at the periphery of a cylinder to support the fingers and guide them in their lengthwise and rocking movements and to close the openings in the cylinder wall through which the fingers extend. These bearings deteriorate rapidy in use. Furthermore, the performance of these conventional mechanisms is not entirely satisfactory. For example, the movements of the protruding ends of the fingers are jerky and have components which are inimical to effective feeding; the fingers tending to press the crop against the surface of the cylinder, with the result that some of the crop may begin to wrap itself around the cylinder instead of being driven straight toward the rear.

Another flaw in the operation of the conventional mechanism is with respect to speed. With such mechanism applied to a tubular auger that feeds the collected crop from both ends toward the middle, where the finger mechanism begins to act, the finger mechanism may not be able to clear away the crop as fast as it is received, with the auger rotating at the speed required for handling any given crop. One factor in the creation of this disability is that the fingers are not operated without lost motion and with smooth rectilinear movement in a manner to achieve maximum protrusion thereof.

The object of the present invention is to produce a simple and novel finger mechanism that shall be free from the objections to prior mechanisms, some of which have been noted above, and that shall be efficient in operation.

Some of the subsidiary objects of the invention are to create a sturdy, durable finger mechanism that is easy to install and adjust; to achieve smoother and more even operation than is possible with prior constructions; to eliminate wobbling motion of the fingers and cause them to remain at all times at right angles to planes tangent to the cylinder at the points of emergence of the fingers; to secure greater projection, than previously, of fingers beyond the periphery of the cylinder for a given length of finger; to permit the use of simple, stationary bearings for the fingers at the periphery of the cylinder, which bearings may be conveniently renewed at little cost in labor and material; to make possible higher speed of operation than heretofore; to create a unique type of finger unit; and to provide a finger mechanism of such construction and arrangement whereby, during the rotation of the cylinder, the free outer ends of the fingers are caused to move in elliptical paths due to its revolution about two relatively offset shafts 14 and 36.

The various features of novelty whereby the present invention is characterized will hereinafter be pointed out with particularity in the claims; but, for a full understanding of the invention and its objects and advantages, reference may be had to the following detailed description, taken in connection wth the accompanying drawings, wherein:

Fig. 1 is a front elevation of a conventional, tubular auger, symbolic of cylinders in general, forming part of crop feeding means in a combine, and having my invention applied thereto;

Fig. 2 is a view similar to Fig. 1, on a larger scale and with a portion of the cylindrical wall broken away, and one end of the apparatus being omitted;

Fig. 3 is a section, on a still larger scale, on line 3—3 of Fig. 2;

Fig. 4 is a view, more or less diagrammatic, similar to but smaller than Fig. 3, showing only one of the finger units, in full lines in one position and in broken lines in several other positions;

Fig. 5 is an end view showing the left hand end of the apparatus as it appears in Fig. 2; and Fig. 6 illustrates a modified finger element.

In carrying out my invention I dispense entirely with hinges and movable bearings for the fingers, using only rigid finger units each of which contains a plurality of fingers that are slidably supported in the cylinder wall for reciprocating rectilinear movements only; the actual fingers of each unit remaining at all times in the same diametrical plane.

Referring to the drawings, 10 is a tube or hollow cylinder located between two stationary plates or walls 11 and 12, one at each end. Member 10, illustrated as having the form of an auger, will hereinafter be referred to as the cylinder. The cylinder is supported by two aligned shafts, 14 and 15, that extend into the same at opposite ends, at the axis of the cylinder. Shaft 14 is normally stationary and extends through and, for adjustment purposes, is rotatable relatively to two brackets or partitions 16 and 17 of generally triangular shape fixed to and within the cylinder in spaced relation to each other lengthwise of the cylinder. Shaft 15 is keyed or otherwise fixed to two brackets or partitions 18 and 19 similar to the other two which are similarly fixed to the cylinder. Shaft 15 has a pulley 20 on its outer end for delivering power to rotate the cylinder.

It is desirable to be able to shift the cylinder and the shafts 14 and 15 as a unit in an upward and rearward direction, to this end the actual supports for the shafts are two like plates, 21, 21, each containing a bearing for one of the shafts and two parallel slots 22, 22 on opposite sides of the bearing and inclined upwardly and rearwardly. Each of the walls, 11 and 12, contains a slot 23 paralleling and midway between the corresponding slots 22, 22, after plates 21 are secured to the corresponding walls. Shafts 14 and 15 extend through slots 23 and therefore can be shifted after bolts 24 are loosened.

Normally shaft 14 remains stationary. However, it is desirable that this shaft may be adjustable angularly of its axis. I have therefore provided a simple means that serves both as a lock against rotation on the part of the shaft and as a means for adjusting it as aforesaid. This means, as best shown in Fig. 5, includes a radial arm 25 fixed to the outer end of shaft 14. In this arm, toward its free end, is a long, radial slot 26. Cooperating with arm 25 is another arm 27, hinged at one end to wall 11 and containing toward its free end a longitudinal slot 29. A bolt 30, passing through slots 26 and 29, secures the two arms together. When the bolt is tightened, shaft 14 is locked in whatever angular position it may at the time be in. Upon loosening the bolt, arm 25 may be rocked to change the angular position of the shaft.

Within the cylinder, nearer the driven end than the end supported by shaft 14, is a fifth bracket or partition 31, similar to the other partitions. Freely supported in this additional partition 31 is a short stub shaft 32, axially aligned with the other two shafts 14 and 15. Fixed to shaft 32 is a crank arm 34.

Fixed to the inner end of normally stationary shaft 14 is a crank arm 35 that is a duplicate of crank arm 34. Spanning the space between these two crank arms and fixed to the free ends of the latter is a stationary control shaft 36. As shown in Fig. 3, crank arm 35 is divided lengthwise into halves in each of which are halves of two cylindrical bores 35$^a$ and 35$^b$. Shaft 14 fits into one of these bores and shaft 36 into the other. Bolts 37, 37 pass through the arm and the portions of the shafts embraced by the arm; thereby clamping the two halves of the arm together in gripping relation to the shafts. Arm 34 similarly serves to form a rigid connection between control shaft 36 and stub shaft 32.

Thus shafts 14, 36 and 32 are secured together into a rigid whole which may be shifted angularly of the axis of the cylinder and be locked in any position to which it may have been brought, by adjusting and locking shaft 14 as heretofore explained.

The most important single feature of the invention is the individual finger unit. In the particular form illustrated, as more clearly shown in Figs. 2 and 3, such a unit is based on an elongated central body member or yoke 38; the same being conveniently formed of bar material bent and welded together to create two long, parallel legs 38$^a$ and connecting end portions 38$^b$. The long, open center of the yoke will hereinafter be referred to as a slot. Welded to the legs, midway between the ends of the yoke, and standing at right angles thereto, are two U-shaped finger elements that extend in opposite directions and lie in a common plane disposed axially of the cylinder. In each finger unit shown more clearly in Fig. 2, these elements are two U-shaped parts or fingers 39 and 40; their closed ends being welded to the yoke while the two arms of the U constitute the actual fingers. It will be seen that the closed ends of these U-shaped finger elements extend transversely of the yoke slot. Thus there are four fingers on each yoke. The two U-shaped elements of each unit are so placed that no two of the actual fingers in a unit are axially aligned with each other, although they are all parallel to each other and offset axially relatively one to the other.

The dimension of a complete finger unit, lengthwise of the fingers, is greater than the diameter of cylinder 10; preferably being one and one half as great in the example illustrated.

Within the slot in each yoke is a roller 41 the diameter of which equals the width of the slot. Flanges 41$^a$ on the ends of the rollers hold them in their slots while allowing them to rotate and move lengthwise of the slots.

In the wall of the cylinder are large openings 10$^a$, arranged in pairs spaced lengthwise of the cylinder in the zone spanned by control shaft 36; the openings of each pair being at opposite sides of the cylinder and relatively axially offset and there is angular displacement of adjacent pairs, that is, for example, a diameter that intersects the openings of any given pair is at right angles to that which intersects the next adjacent axially spaced pair.

Openings 10$^a$ are provided with covers 42 which may conveniently be secured in place by short bolts 44. These covers contain the holes through which the fingers of the corresponding units operate; the holes in each pair being in a plane containing the axis of the cylinder. In the arrangement shown the fingers of two units lie in the same plane and alternate with those of the other two units which lie in a plane at right angles to the latter plane.

When the parts of the apparatus are assembled the rollers 41 are rotatably mounted on the control shaft 36 and are slidable within the slots of the yokes 38. The parts are so proportioned that when the finger units have been mounted on the control shaft, the fingers extend through the openings 10$^a$ when the covers are off. The covers may then be applied, thus providing good bearings for each finger that intersects it.

In the arrangement shown, the bearings for the fingers are composed of the bearings proper 45 and holders 46 therefor. Members 45 are preferably cylindrical tubular blocks of rubber reenforced with cotton fiber and impregnated with wax. Each holder 46 is formed of wide, strip-like plate pressed out to form a central U-shaped cuplike portion 46$^a$ with wings 46$^b$ extending laterally from the free ends of the arms of the U. The arms are formed slightly arcuate in cross-section so as to lie in a cylindrical plane with the dimensions of the arms in the circumferential direction being such that bearings 45 may be inserted or removed through the openings between them after the holder is welded or otherwise fastened to the cover.

In using the apparatus the cylinder and the shafts are adjusted bodily and the control shaft is adjusted angularly of the axis of the cylinder to suit the nature of the particular crop to be harvested. Subsequent procedure in the field may be along conventional lines.

Assuming that the cylinder as viewed in Fig. 3 is turning in the counter-clockwise direction, while control shaft 36 remains stationary, it will be seen that each finger unit can move in only one direction relatively to the cylinder, namely, in the direction lengthwise of the fingers. This movement is brought about by the thrust of first one leg of the yoke and then the other on the antifriction roller 41 mounted on the control shaft and fitting into the slot in the yoke; the roller simply moving in reverse directions longitudinally of the slot, once during each revolution of the cylinder, and serving as a stationary, antifriction actuator of the oppositely disposed pair of fingers.

Because the fingers in any one unit remain at all times in the same diametral plane, their outer ends may be caused to protrude farther during, for example, the posterior part of their downward movement than if they were hinged to the control shaft, and do the same beginning with their upward swing; thus enabling the fingers to come down on taller crops and to come closer to an underlying support for crop being moved rearwardly.

It has been found in actual practice that cylinders embodying my invention may be driven at higher speeds than heretofore, thereby making it unnecessary to slow down the harvesting operation because of speed limitations inherent in mechanisms employing conventional retractable fingers.

During a harvesting and feeding operation the movements of the fingers are smooth and steady, free from the unevenness and jerk incident to hinging the fingers which compels them to rock while shifting lengthwise. This not only conserves energy and affords other advantages in operation, but wear on the bearings for the fingers is greatly reduced, and the bearings themselves become simpler and less expensive and can easily be replaced when necessary.

It will also be seen that the substitution of the sturdy yokes and rollers for heretofore employed hinge joints for actuating the fingers results in greatly increased ruggedness and longer life of the mechanism.

In certain harvesters that combine comparatively fine grains such as flax, barley and millet it may be desirable to have fingers in groups with less spacing between them than that in the U-shaped construction. In that event each U may be provided with a third finger 39$^a$ welded between the U as shown in Fig. 6.

From the above description and attached drawings it will be readily apparent:

That the yoke of each unit carries two diametrically oppositely disposed pairs of relatively rigidly associated fingers;

That each pair of fingers of each unit is offset or spaced axially of the cylinder from the other coacting oppositely disposed pair of fingers of that unit;

That the fingers of each unit are spaced longitudinally of the cylinder along the stationary control shaft and are disposed alternately in opposite directions but that all fingers of each unit are in a common plane that is parallel to and intersects the longitudinal axis of the cylinder; and That each unit of four fingers is disposed at a right angle relatively to an adjacent unit of four fingers.

I claim:

1. Crop feeding apparatus for grain harvesting implements, such as combines, comprising a rotatable hollow cylinder having in its wall a plurality of pairs of holes spaced axially of the cylinder and disposed on opposite sides of the cylinder; crop-moving finger units, longer than the diameter of the cylinder, mounted within the cylinder and each unit including two pairs of fingers spaced axially of the cylinder that extend, transversely to the axis of the cylinder, slidably through corresponding pairs of holes in opposite sides of the cylinder, together with a central member within the cylinder to which the two pairs of fingers are affixed in axially offset relation to each other and each said member containing an elongated slot disposed at right angles to and extending transversely to the axis of the cylinder in opposite directions from the longitudinal axes of the fingers; and stationary means within the cylinder extending into said slots to cause said units to reciprocate during the rotation of the cylinder.

2. An apparatus as set forth in claim 1, having means to adjust said stationary means angularly of the axis of the cylinder.

3. An apparatus as set forth in claim 1, wherein each pair of fingers is an element in the shape of a U, located in a plane containing the axis of the cylinder, with the closed end of the U attached to the central member and the arms of the U engaged in two of the holes in the cylinder wall.

4. An apparatus as set forth in claim 1 wherein the axis of reciprocation of each unit is disposed at a right angle relatively to the axis of reciprocation of an adjacent unit.

5. An apparatus as set forth in claim 1, having stationary tubular bearings in the cylinder wall through which said fingers reciprocate in a direction perpendicular to the axis of the cylinder.

6. An apparatus as set forth in claim 1, wherein the cylinder wall contains large openings, and detachable covers therefor, and wherein the holes for the passage of the fingers are contained in such covers.

7. An apparatus as set forth in claim 1, wherein the cylinder wall contains large openings and detachable covers for said openings, and wherein there are mounted on the inner sides of the covers detachable, stationary sleeve bearings which provide tubular holes through which the fingers reciprocate perpendicularly to the axis of the cylinder.

8. A crop feeding apparatus for a grain harvesting implement, such as a combine, comprising a rotatable hollow cylinder having in its wall pairs of circular holes distributed lengthwise of the cylinder on opposite sides of the cylinder; rigid finger units within the cylinder and longer than the diameter of the latter, each such unit including at least four cylindrical fingers that extend through the holes forming one such pair on each opposite side of the cylinder and at all times have rectilinear reciprocations, together with a central member to which the fingers are fixed, and each of said members containing a long slot disposed at right angles to and extending in opposite directions from the fingers; and stationary means within the cylinder parallel to and radially spaced apart from the cylinder axis, with rotatable cylindrical elements on said means entered in such slots and forming part of such means; the width of each slot being equal to the diameter of said cylindrical element and its length being at least twice as great as the radius from said axis to the farthest point on the cylindrical element.

9. A crop feeding apparatus for a grain harvesting implement, such as a combine, comprising a rotatable hollow cylinder having in the wall thereof pairs of holes distributed lengthwise of the cylinder on opposite sides of the cylinder; a stationary shaft within and extending throughout the length of that part of the cylinder containing said holes, said stationary shaft being parallel to and radially spaced apart from the cylinder axis; a plurality of finger units within and longer than the diameter of the cylinder and each unit including two U-shaped fingers that extend in opposite directions slidably through the holes of two of said pairs disposed on opposite sides of the cylinder, together with a central yoke to the opposite sides of which said U-shaped fingers are fixed; each yoke enclosing an elongated slot disposed at right angles to and extending in opposite directions beyond the axes of said fingers; said stationary shaft extending through said slots and having thereon, within the slots, rollers flanged to hold them within the slots; the width of each slot being equal to the diameter of the roller and its length being at least twice as great as a radius from the axis of the cylinder to the remotest periphery of the roller.

10. An apparatus as set forth in claim 9 having, in addition, means to adjust the stationary shaft angularly of the axis of the cylinder.

11. In a feeder for a crop harvesting implement comprising a rotatable hollow cylinder having a stationary shaft extending within the cylinder parallel to but radially spaced from the cylinder axis: the improvement in a retractable finger mechanism comprising a plurality of crop-engageable finger units within the cylinder, each unit including two U-shaped fingers extending in opposite directions slidably through perforations in opposite sides of the cylinder and each pair of fingers of each unit being offset axially of the cylinder from the coacting oppositely disposed pair of fingers of that unit and the diametrically disposed longitudinal axis of each unit being disposed at a right angle relatively to the diametrically disposed longitudinal axis of an adjacent unit, together with a central yoke to the opposite sides of which said U-shaped fingers are affixed, and each yoke enclosing an elongated opening disposed at right angles to and extending in opposite directions beyond said fingers, said stationary shaft extending through said elongated openings and having thereon, within said openings, rollers flanged to hold them within the yokes while said yokes are revolved about said rollers during the reciprocations of said fingers in response to the rotation of the cylinder.

12. A retractable finger unit for use in a cylindrical feeder of a harvesting implement, comprising an elongated body member containing a long slot extending lengthwise thereof, together with a plurality of U-shaped fingers projecting in opposite directions from the long sides of said member in a plane disposed at right angles to the long axis of said slot and joined at their closed ends to said body member, said fingers being so disposed that the longitudinal axes of no two oppositely disposed fingers are in rectilinear alignment but all are parallel to each other.

13. A retractable finger unit for use in a cylindrical feeder of a harvesting implement, comprising an elongated body member containing a long slot extending lengthwise thereof, together with fingers projecting in opposite directions from the long sides of said member in a plane disposed at right angles to the long axis of said slot, said fingers being U-shaped elements arranged so that the four arms thereof lie in four separate lines that are parallel to each other and are in a plane containing the axis of the cylinder.

14. A retractable finger unit for use in a cylindrical feeder of a harvesting implement, comprising an elongated body member containing a long slot extending lengthwise thereof, together with fingers projecting in opposite directions from the long sides of said member in a plane disposed at right angles to the long axis of said slot, said fingers being U-shaped elements each containing a third intermediate finger that forms with the two arms of the U a trident.

References Cited in the file of this patent

UNITED STATES PATENTS 2,491,739     La Dow  ---------------- Dec. 20, 1949